United States Patent
Deng

(10) Patent No.: US 9,716,434 B2
(45) Date of Patent: Jul. 25, 2017

(54) SWITCH CONTROL CIRCUIT AND CONTROL METHOD FOR A FOUR-SWITCH BUCK-BOOST CONVERTER

(71) Applicant: Silergy Semiconductor Technology (Hangzhou) LTD, Hangzhou, ZheJiang Province (CN)

(72) Inventor: Fuhua Deng, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 14/921,025

(22) Filed: Oct. 23, 2015

(65) Prior Publication Data

US 2016/0141958 A1 May 19, 2016

(30) Foreign Application Priority Data

Nov. 13, 2014 (CN) .......................... 2014 1 0670391

(51) Int. Cl.
*H02M 3/158* (2006.01)
*H02M 1/00* (2006.01)

(52) U.S. Cl.
CPC .. *H02M 3/1582* (2013.01); *H02M 2001/0003* (2013.01)

(58) Field of Classification Search
CPC ...... H02M 3/155; H02M 3/156; H02M 3/158; H02M 3/1582; H02M 2001/0003; H02M 2001/0006
See application file for complete search history.

(56) References Cited

U.S. PATENT DOCUMENTS

| 6,275,016 | B1* | 8/2001 | Ivanov | H02M 3/158 323/224 |
| 7,292,016 | B2 | 11/2007 | Wake | |
| 7,466,112 | B2* | 12/2008 | Zhou | H02M 3/1582 323/225 |
| 2009/0108820 | A1 | 4/2009 | Mirea | |
| 2011/0156685 | A1* | 6/2011 | Chen | H02M 3/1582 323/284 |
| 2013/0328534 | A1* | 12/2013 | Hsieh | G05F 3/02 323/271 |
| 2014/0210437 | A1 | 7/2014 | Chen | |

* cited by examiner

*Primary Examiner* — Matthew Nguyen
(74) *Attorney, Agent, or Firm* — Michael C. Stephens, Jr.

(57) ABSTRACT

An apparatus can include: (i) a power stage circuit including first, second, third, and fourth switches and an inductor; (ii) a constant time control circuit configured to generate a switch trigger signal according to switching signals of the first and third switches; (iii) a PWM control circuit configured to receive an input voltage signal via the input terminal, an output voltage via the output terminal, and the switch trigger signal, and to generate switching signals to control the first, second, third, and fourth switches; and (iv) the PWM control circuit being configured to turn on or off the first and third switches in response to the switch trigger signal being activated.

10 Claims, 6 Drawing Sheets

SWITCH CONTROL CIRCUIT AND CONTROL METHOD FOR A FOUR-SWITCH BUCK-BOOST CONVERTER

RELATED APPLICATIONS

This application claims the benefit of Chinese Patent Application No. 201410670391.8, filed on Nov. 13, 2014, which is incorporated herein by reference in its entirety.

FIELD OF THE INVENTION

The present invention generally relates to the field of power electronics, and more specifically to switch control circuits and associated control methods for a four-switch buck-boost type of converter.

BACKGROUND

A switch controller may be used to control the operation mode of a power stage circuit in a buck-boost converter by controlling the switches according to the input voltage and the output voltage. For example, such a control method can include variable frequency control of constant on time or constant off time. However, as phase angles and frequency of the input voltage and the input current may not match each other in variable frequency control, the system may be unstable and a number of components may be needed, which can result in relatively complicated control in some cases.

SUMMARY

In one embodiment, an apparatus can include: (i) a power stage circuit including a first switch, an inductor, and a fourth switch coupled in series between input and output terminals, a second switch having a first terminal coupled to a common node of the first switch and the inductor, and a second terminal coupled to ground, a third switch having a first terminal coupled to a common node of the fourth switch and the inductor, and a second terminal coupled to ground; (ii) a constant time control circuit configured to generate a switch trigger signal according to switching signals of the first and third switches; (iii) a pulse-width modulation (PWM) control circuit configured to receive an input voltage signal via the input terminal, an output voltage via the output terminal, and the switch trigger signal, and to generate switching signals to control the first, second, third, and fourth switches; and (iv) the PWM control circuit being configured to turn on or off the first and third switches in response to the switch trigger signal being activated.

In one embodiment, a method can include: (i) providing a power stage circuit that includes a first switch, an inductor, and a fourth switch coupled in series between input and output terminals, a second switch having a first terminal coupled to a common node of the first switch and the inductor, and a second terminal coupled to ground, a third switch having a first terminal coupled to a common node of the fourth switch and the inductor, and a second terminal coupled to ground; (ii) generating, by a constant time control circuit, a switch trigger signal according to switching signals of the first and third switches; (iii) generating switching signals to control the first, second, third, and fourth switches by a PWM control circuit, in response to an input voltage signal via the input terminal, an output voltage via the output terminal, and the switch trigger signal; and (iv) turning on or off the first and third switches by the PWM control circuit in response to the switch trigger signal being activated.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
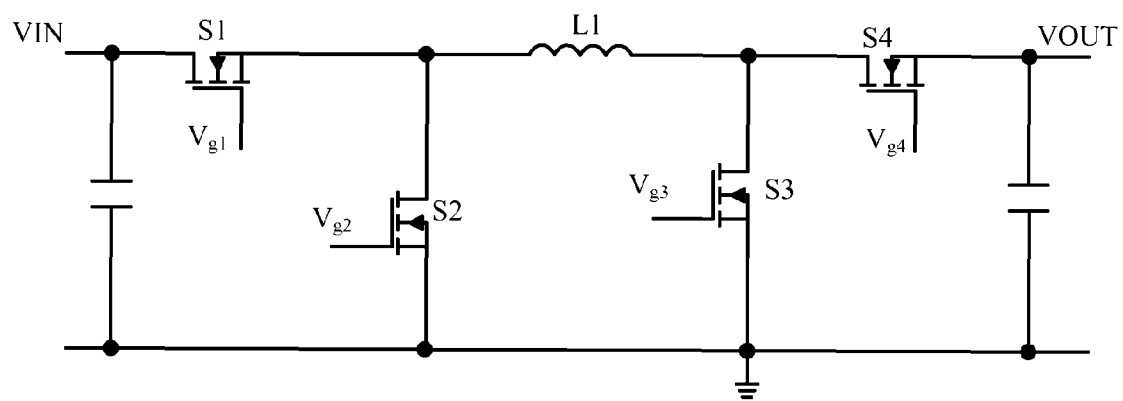
FIG. 1 is a schematic block diagram of an example power stage circuit in a four-switch buck-boost converter.

Referring now to FIG. 1, shown is a schematic block diagram of an example power stage circuit in a four-switch buck-boost converter. In this example, the power stage circuit can receive input voltage VIN, and may generate output voltage VOUT after conversion. The four-switch buck-boost converter can include inductor L1, switch S1 connected between input voltage VIN and a first terminal of inductor L1, switch S2 connected between the first terminal of the inductor L1 and ground, and switch S3 connected between a second terminal of inductor L1 and output voltage VOUT. For example, switches S1 and S2 may form a buck bridge arm, and switches S3 and S4 may form a boost arm. When input voltage VIN is lower than output voltage VOUT, the buck bridge arm may operate in an open-loop with a largest duty cycle, and the boost bridge arm may operate in a closed loop, and vice versa when input voltage VIN is larger than output voltage VOUT.

In one embodiment, an apparatus can include: (i) a power stage circuit including a first switch, an inductor, and a fourth switch coupled in series between input and output terminals, a second switch having a first terminal coupled to a common node of the first switch and the inductor, and a second terminal coupled to ground, a third switch having a first terminal coupled to a common node of the fourth switch and the inductor, and a second terminal coupled to ground; (ii) a constant time control circuit configured to generate a switch trigger signal according to switching signals of the first and third switches; (iii) a pulse-width modulation (PWM) control circuit configured to receive an input voltage signal via the input terminal, an output voltage via the output terminal, and the switch trigger signal, and to generate switching signals to control the first, second, third, and fourth switches; and (iv) the PWM control circuit being configured to turn on or off the first and third switches in response to the switch trigger signal being activated.

Figure 2:
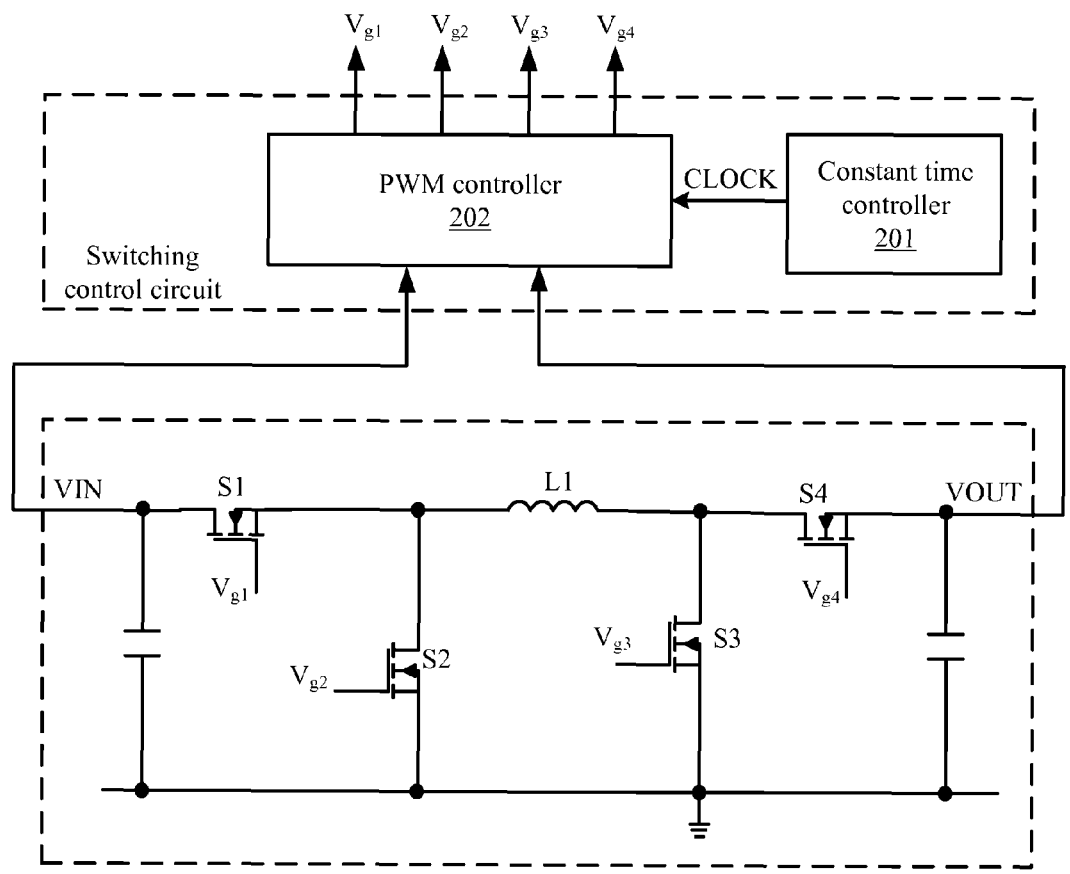
FIG. 2 is a schematic block diagram of an example four-switch buck-boost converter, in accordance with embodiments of the present invention.

Referring now to FIG. 2, shown is a schematic block diagram of an example four-switch buck-boost converter, in accordance with embodiments of the present invention. In this particular example, the four-switch buck-boost converter can include a power stage circuit, which may include switch S1, and inductor L1 and switch S4 that can connect in series between an input terminal and an output terminal. The power stage circuit can also include switch S2 having a first terminal coupled to a common node of switch S1 and inductor L1, and a second terminal coupled to ground. The power stage circuit can also include switch S3 having a first terminal coupled to a common node of switch S4 and inductor L1, and a second terminal coupled to ground. For example, switches S1 and S3 can be triodes or transistors, and switches S2 and S4 can be triodes, transistors, or diodes.

The switching control circuit can include constant time controller 201 and PWM controller 202. Constant time controlling circuit 201 can generate switching trigger signal CLOCK according to on and off signals of switches S1 and S3. PWM controller 202 can receive input voltage VIN, output voltage VOUT, and switching trigger signal CLOCK of the power stage circuit, and may generate four switching signals $V_{g1}$, $V_{g2}$, $V_{g3}$, and $V_{g4}$ to respectively control the switching actions of switches S1, S2, S3, and S4. PWM controller 202 can control switches S1 and S3 to be turned on, or switches S1 and S3 to be turned off, when switching trigger signal CLOCK is activated (e.g., goes high). In this particular example, by controlling the time of turning on/off switches S1 and S3, in order to achieve constant off time or constant on time control with quasi-fixed frequency control.

Figure 3A:
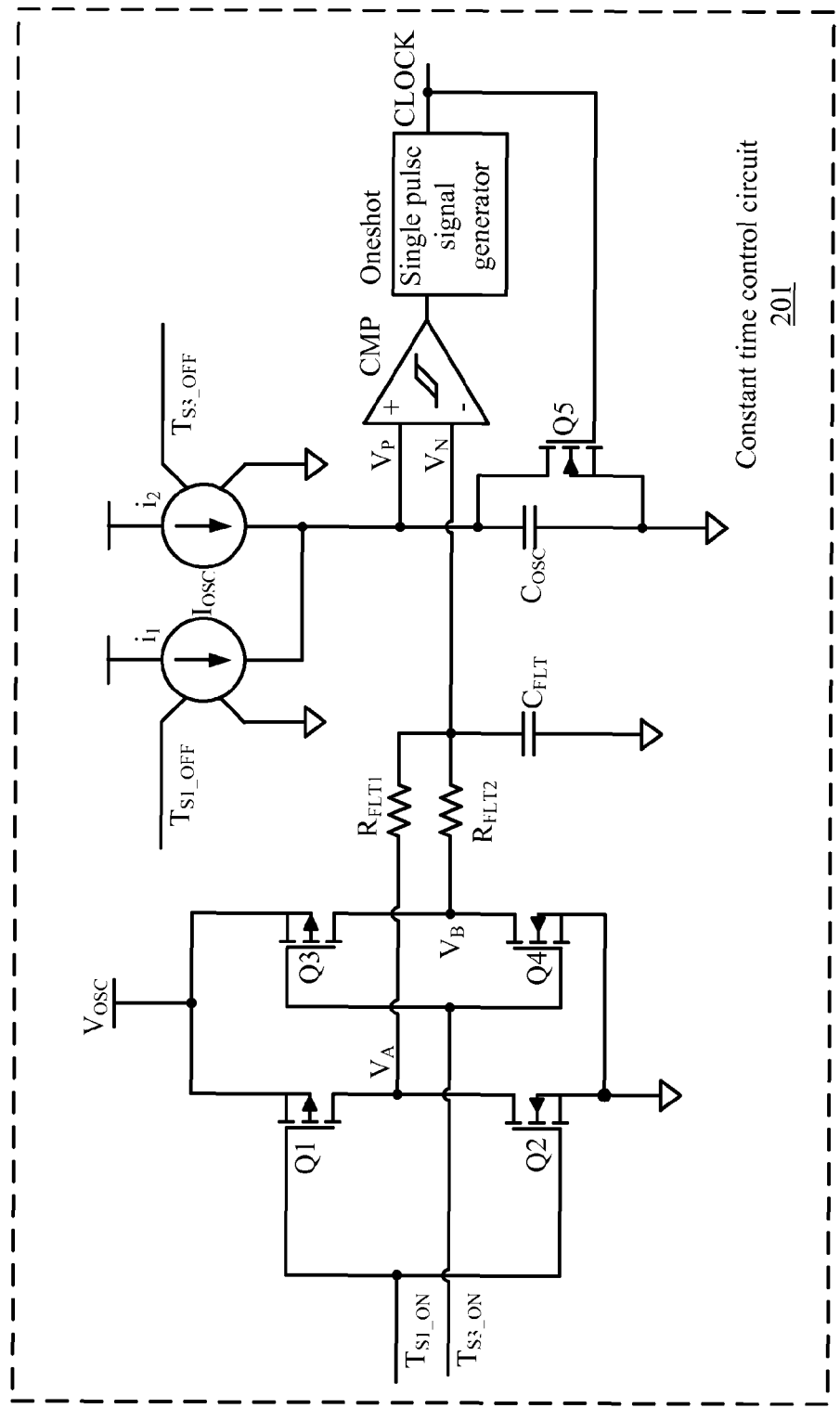
FIG. 3A is a schematic block diagram of a first example constant time controlling circuit of a four-switch buck-boost converter, in accordance with embodiments of the present invention.

Referring now to FIG. 3A, shown is a schematic block diagram of a first example constant time controlling circuit of a four-switch buck-boost converter, in accordance with embodiments of the present invention. In this particular example, the constant time controlling circuit can include a first chopper including transistors Q1 and Q2, a second chopper including transistors Q3 and Q4, a filter circuit including resistors $R_{FLT1}$ and $R_{FLT2}$, a first ramp generating circuit including controlled current sources $i_1$ and $i_2$, capacitor $C_{OSC}$ and switch Q5, and a comparison circuit including comparator CMP.

For example, the first and second choppers can be in a push-pull structure that includes a P-type transistor and an N-type transistor. Transistor Q1 can be a P-type transistor, and transistor Q2 can be an N-type transistor. Transistors Q1 and Q2 can connect between voltage signal $V_{OSC}$ and ground. The control terminals of transistors Q1 and Q2 can receive a switching signal of switch S1. When the switching signal of switch S1 is active (e.g., switch S1 is turned on), transistor Q2 may be turned on, and when switch S1 is turned off, transistor Q1 can be turned on. Thus, the average value of chopped signal $V_A$ can be obtained from voltage signal $V_{OSC}$ via a first chopping circuit, where $T_{S1\_ON}$ represents the on time of switch S1, and $T_{S1\_OFF}$ represents the off time of switch S1. This regulation may also be applicable to switches S2-S4.

$$\overline{V_A} = V_{OSC} \times \frac{T_{S1\_OFF}}{T} \tag{1}$$

In formula (1), T is the switching cycle, and $T_{S1\_OFF}$ is the off time of switch S1. It can be seen from formula (1) that the average value of chopped signal $V_A$ is in direct proportion to the off time of switch S1.

Similarly, transistors Q3 and Q4 in the second chopping wave can connect between voltage signal $V_{OSC}$ and ground, and the control terminals of transistors Q3 and Q4 can receive a switching signal of switch S3. When the switching signal of switch S3 is active (e.g., switch S3 is turned on), transistor Q4 can be turned on. When switch S3 is turned off, transistor Q3 may be turned on, and the average value of chopped signal $V_B$ can be obtained from voltage signal $V_{OSC}$ via the first chopping circuit.

$$\overline{V_B} = V_{OSC} \times \frac{T_{S3\_OFF}}{T} \tag{2}$$

In formula (2), $T_{S2\_OFF}$ is the off time of switch S3, and it can be seen that the average value of chopped signal $V_B$ is in direct proportion to the off time of switch S3.

Chopped signals $V_A$ and $V_B$ may then be filtered by a filter circuit. As shown in FIG. 3A, resistors $R_{FLT1}$ and $R_{FLT2}$ can be respectively coupled to chopped signals $V_A$ and $V_B$, and chopped signals $V_A$ and $V_B$ can be filtered after superposition. For example, resistor $R_{FLT1}$, resistor $R_{FLT2}$, and capacitor $C_{FLT1}$ may form a low-pass filter with a bandwidth that is far lower than the switching frequency. Therefore, filtered signal $V_N$ may be close to the DC voltage in a relatively short time, such in a time that is far less than $2\pi R_{FLT}C_{FLT}$, and the value of filtered signal $V_N$ can be obtained as:

$$V_N = V_{OSC} \times \frac{T_{S1\_OFF} + T_{S3\_OFF}}{2 \times T} \tag{3}$$

The total off time of switches S1 and S3 can be derived from formula (3):

$$T_{S1\_OFF} + T_{S3\_OFF} = C_{OSC} \times \frac{V_N}{I_{OSC}} \tag{4}$$

It can be seen from formula (4) that the total off time of switches S1 and S3 is a fixed value, so constant off time control can be applied in this particular example. In addition, the switching control circuit can include controlled current source $i_1$, controlled current source $i_2$, and a first ramp signal generator including capacitor $C_{OSC}$ and switch Q5. Controlled current source $i_1$ can receive a first current source and the first switching signal of switch S1, and may generate current signal $I_{OSC}$ when switch S1 is off.

Controlled current source $i_2$ can receive the first current source and the switching signal of switch S3, and may generate current signal $I_{OSC}$ when switch S3 is off. The first terminal of capacitor $C_{OSC}$ can connect to output terminals of controlled current sources $i_1$ and $i_2$, and the second terminal can be grounded. Switch Q5 can connect in parallel with capacitor $C_{OSC}$ with its control terminal receiving switching trigger signal CLOCK. In this way, controlled current sources $i_1$ and $i_2$ can generate current signal $I_{OSC}$ in the off time of switches S1 and S3 (e.g., $T_{S1\_OFF}$ and $T_{S3\_OFF}$) while remaining at zero at other times. Thus, the maximum value of voltage signal $V_P$ across capacitor $C_{OSC}$ is:

$$V_{P\_MAX} = I_{OSC} \times \frac{T_{S1\_OFF} + T_{S3\_OFF}}{C_{OSC}} \qquad (5)$$

Figure 3B:
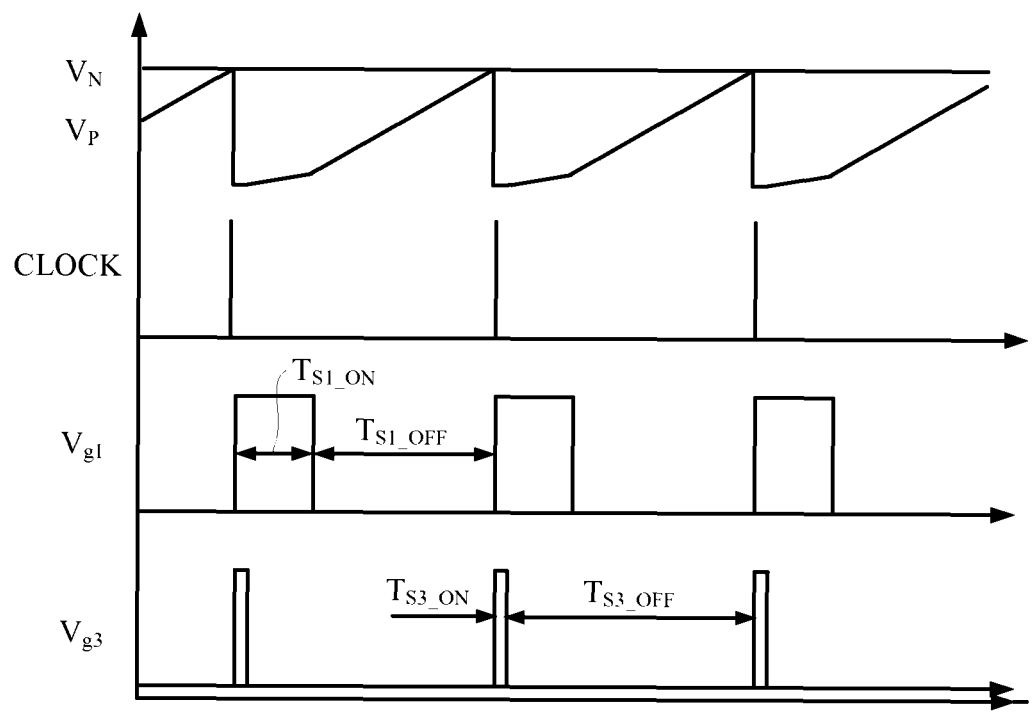
FIG. 3B is a waveform diagram showing example operation of the circuit of FIG. 3A, in accordance with embodiments of the present invention.

Referring now to FIG. 3B, shown is a waveform diagram showing example operation of the circuit of FIG. 3A, in accordance with embodiments of the present invention. During activated times of $T_{S1\_OFF}$ and $T_{S3\_OFF}$, voltage signal $V_P$ across capacitor $C_{OSC}$ can rise faster than in a proceeding segment. The inverting input terminal of comparator CMP can receive filtered signal $V_N$, and the non-inverting input terminal can receive voltage signal $V_P$ across capacitor $C_{OSC}$. When voltage signal $V_P$ reaches a level of filtered signal $V_N$, comparator CMP may output a high level signal to trigger single pulse generating circuit "Oneshot" to activate switch trigger signal CLOCK.

When switch trigger signal CLOCK goes active high, the switching signals of switches S1 and S3 may both go active high, so switches S1 and S3 can be turned on. Here, switch trigger signal CLOCK may be provided to PWM control circuit 202, and PWM control circuit 202 can control switches S1 and S3 to be turned on. In this particular example, the turning off moment (point in time), on time, and off time of switches S1 and S3 can be controlled by PWM control circuit 202 according to the input voltage and a feedback signal of the output voltage. PWM control circuit 202 can be implemented in any suitable fashion, such as including charge and discharge control. For example, when a voltage signal $V_{P\_MAX}$ reaches filtered signal $V_N$, i.e., $V_{P\_MAX} = V_N$, the following formula can be obtained according to formulas (3) and (5):

$$T = \frac{V_{OSC} \times C_{OSC}}{2 I_{OSC}} \qquad (6)$$

In formula (6), voltage signal $V_{OSC}$ is fixed, capacitor $C_{OSC}$ is fixed, and the current signal $I_{OSC}$ is also fixed, so the switching cycle of this particular example is fixed by applying the above-described constant time control circuit. However, in many particular circuit applications, as the parameters may change under different circumstances, the switching cycle may change slightly, thus particular embodiments may utilize a constant off time control scheme with a quasi-fixed frequency.

Figure 4A:
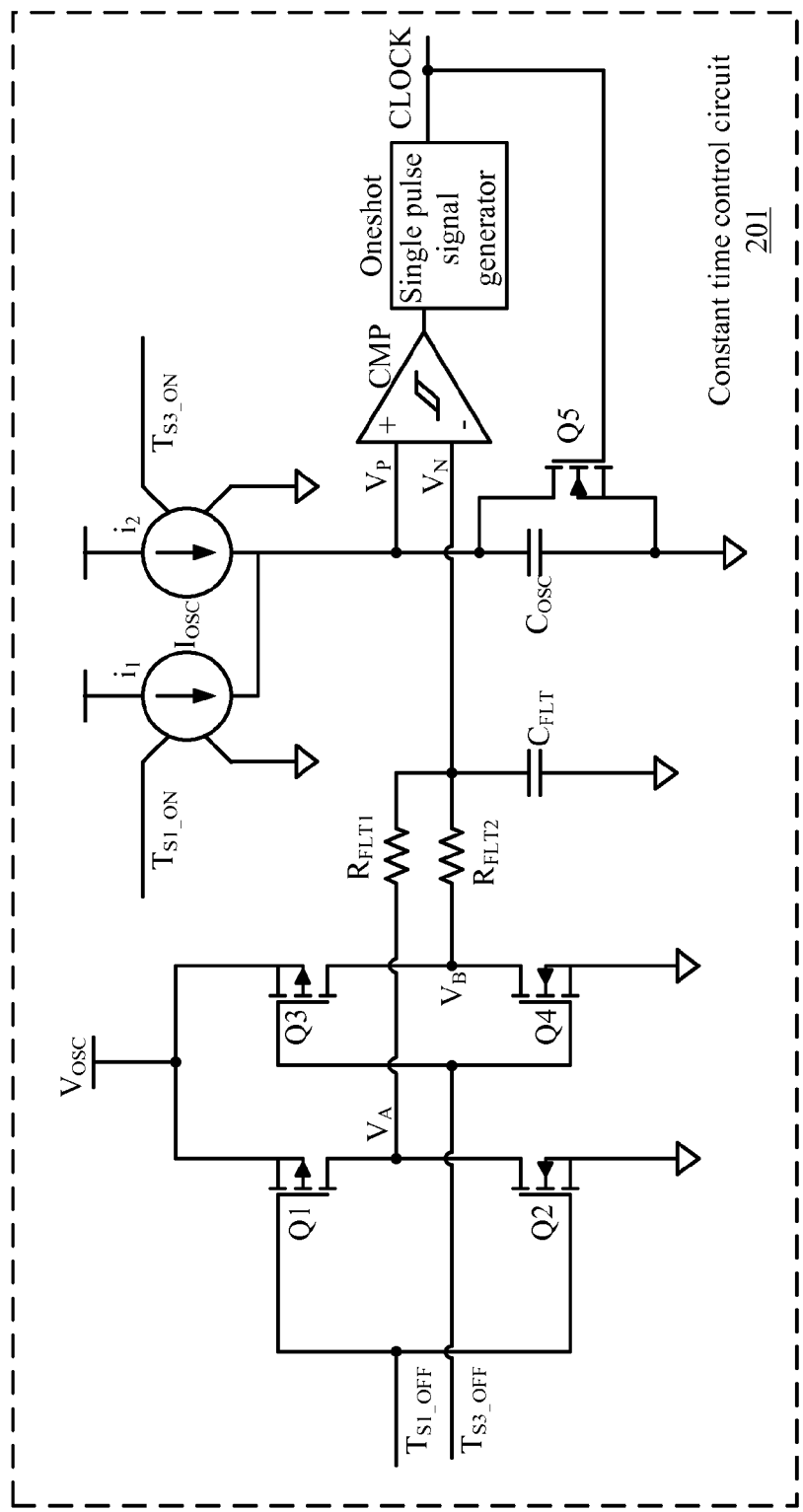
FIG. 4A is a schematic block diagram of a second example constant time controlling circuit of a four-switch buck-boost converter, in accordance with embodiments of the present invention.

Referring now to FIG. 4A, shown is a schematic block diagram of a second example constant time controlling circuit of a four-switch buck-boost converter, in accordance with embodiments of the present invention. In this particular example, the constant time control circuit may have the same general circuit configuration as that of the first example above. However, in this case, a constant on time control scheme can be employed whereby the control terminals of transistors Q1 and Q2 are configured to receive a switching signal of switch S1, and when the switching signal of switch S1 is inactive (e.g., switch S1 is off), transistor Q2 can be turned on. Also, when switch S1 is turned on, transistor Q1 can be turned on. Thus, the average value of chopped signal $V_A$ may be obtained by chopping voltage signal $V_{OSC}$ via a first chopping circuit, and can be represented as:

$$\overline{V_A} = V_{OSC} \times \frac{T_{S1\_ON}}{T} \qquad (7)$$

Here, T is the switching cycle, and $T_{S1\_ON}$ is the on time of switch S1. It can be seen from formula (7) that the average value of chopped signal $V_A$ is in direct proportion to the on time of switch S1.

Similarly, the control terminals of transistors Q3 and Q4 can receive a switching signal of switch S3. When the switching signal of switch S3 is inactive (e.g., switch S3 is off), transistor Q4 can be turned on. When switch S3 is turned on, transistor Q3 may be turned off. Thus, the average value of chopped signal $V_B$ can be obtained by chopping voltage signal $V_{OSC}$ via the first chopping circuit, and may be represented as:

$$\overline{V_B} = V_{OSC} \times \frac{T_{S3\_ON}}{T} \qquad (8)$$

Here, $T_{S3\_ON}$ is the on time of switch S3. It can be seen from formula (8) that the average value of chopped signal $V_B$ is in direct proportion to the on time of switch S3.

Chopped signals $V_A$ and $V_B$ can be filtered by a filter circuit, and filtered signal $V_N$ may also be close to the DC voltage in a relatively short time, such as a time that is far less than $2\pi R_{FLT} C_{FLT}$. The value of filtered signal $V_N$ can be approximated to:

$$V_N = V_{OSC} \times \frac{T_{S1\_ON} + T_{S3\_ON}}{2 \times T} \qquad (9)$$

The total on time of switches S1 and S3 can be derived from formula (9):

$$T_{S1\_ON} + T_{S3\_ON} = C_{OSC} \times \frac{V_N}{I_{OSC}} \qquad (10)$$

It can be seen from formula (10) that the total on time of switches S1 and S3 is a fixed value, so constant on time control can be applied in certain embodiments.

In this particular example, for a first ramp generating circuit, controlled current source $i_1$ can receive the first current source and the switching signal of switch S1, and when switch S1 is turned on, current source $I_{OSC}$ can be generated. Controlled current source $i_2$ can receive the first current source and the switching signal of switch S3, and when switch S3 is turned on, current signal $I_{OSC}$ can be generated. Therefore, controlled current sources $i_1$ and $i_2$ may generate current signal $I_{OSC}$ during the on time of switches S1 and S3 (e.g., $T_{S1\_ON}$ and $T_{S3\_ON}$), and current signal $I_{OSC}$ can be substantially zero in remaining time portions.

The maximum value of voltage signal $V_P$ across capacitor $C_{OSC}$ can be:

$$V_{P\_MAX} = I_{OSC} \times \frac{T_{S1\_ON} + T_{S3\_ON}}{C_{OSC}} \quad (11)$$

The inverting input terminal of comparator CMP can receive filtered signal $V_N$, and the non-inverting input terminal can receive voltage signal $V_P$ across capacitor $C_{OSC}$. When voltage signal $V_P$ reaches a level of filtered signal $V_N$, comparator CMP may output a high level signal to trigger single pulse generating circuit "Oneshot" to activate switch trigger signal CLOCK.

Figure 4B:
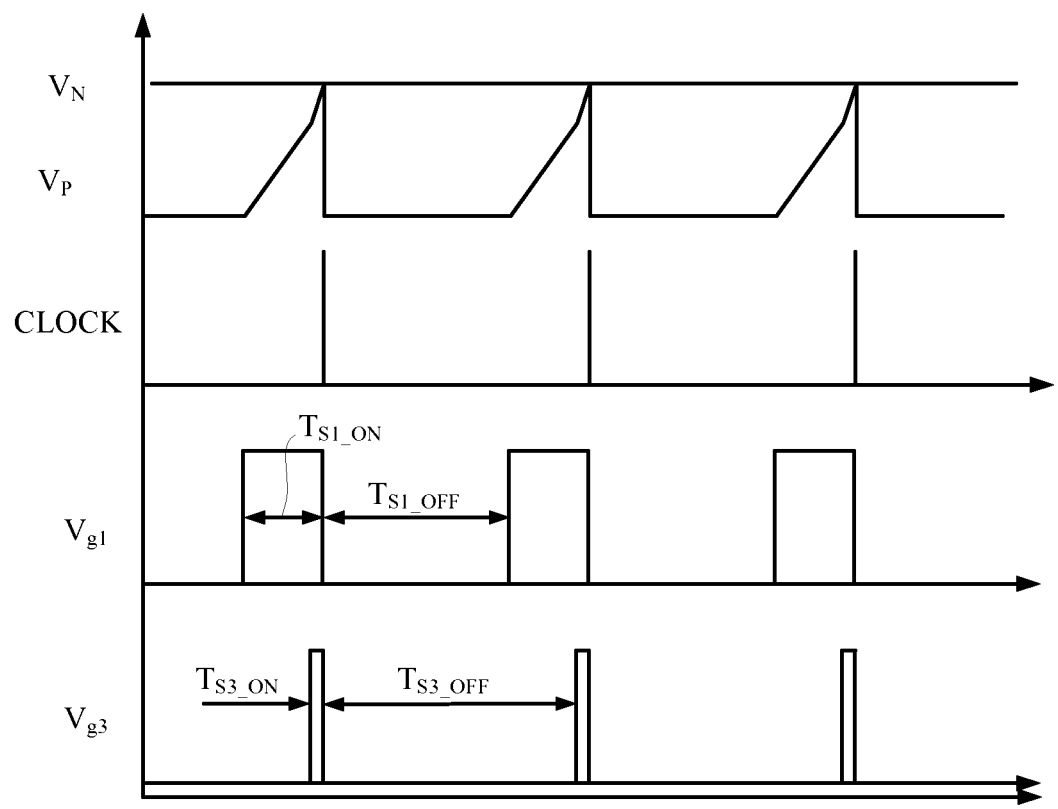
FIG. 4B is a waveform diagram showing example operation of the circuit of FIG. 4A, in accordance with embodiments of the present invention.

Referring now to FIG. 4B, shown is a waveform diagram showing example operation of the circuit of FIG. 4A, in accordance with embodiments of the present invention. In this example, when switch trigger signal CLOCK goes active high, the switching signals of switches S1 and S3 may go inactive low whereby switches S1 and S3 are turned off.

When a voltage signal $V_{P\_MAX}$ reaches a level of filtered signal $V_N$, e.g., $V_{P\_MAX}=V_N$, the following formula can be obtained according to formulas (9) and (11):

$$T = \frac{V_{OSC} \times C_{OSC}}{2I_{OSC}} \quad (12)$$

It can be seen from formula (12) that the switching cycle can be a fixed value, while in some cases, as parameters may change under different operation circumstances, the switching cycle may change slightly. Thus, particular embodiments may employ a constant on time control scheme with a quasi-fixed frequency.

In one embodiment, a method can include: (i) providing a power stage circuit that includes a first switch, an inductor, and a fourth switch coupled in series between input and output terminals, a second switch having a first terminal coupled to a common node of the first switch and the inductor, and a second terminal coupled to ground, a third switch having a first terminal coupled to a common node of the fourth switch and the inductor, and a second terminal coupled to ground; (ii) generating, by a constant time control circuit, a switch trigger signal according to switching signals of the first and third switches; (iii) generating switching signals to control the first, second, third, and fourth switches by a PWM control circuit, in response to an input voltage signal via the input terminal, an output voltage via the output terminal, and the switch trigger signal; and (iv) turning on or off the first and third switches by the PWM control circuit in response to the switch trigger signal being activated.

In particular embodiments, a switch control method for a four-switch buck-boost converter, such as having a power stage circuit as shown in FIG. 2, can include generating a switch trigger signal (e.g., CLOCK) according to the switching signals (e.g., $T_{S1\_ON/OFF}$, $T_{S3ON/OFF}$) of switches S1 and S3. The PWM controller (e.g., 202) can receive an input voltage (e.g., VIN), an output voltage (e.g., VOUT), and the switching trigger signal (e.g., CLOCK) of a power stage circuit, and may generate four switching signals (e.g., $V_{g1}$, $V_{g2}$, $V_{g3}$, and $V_{g4}$), in order to control the switching actions of switches Q1-S4. For example, the PWM controller can control switches S1 and S3 to be turned on, or switches S1 and S3 to be turned off when the switching trigger signal is activated.

When the switch trigger signal is activated, the PWM control circuit can control switches S1 and S3 to be turned by applying a constant off time control scheme with a quasi-fixed frequency, as described herein. For example, a first voltage signal (e.g., $V_{OSC}$) and the switching signal (e.g., $T_{S1\_ON/OFF}$) of switch S1 can be received, and a first chopped signal (e.g., $V_A$) that is in direct proportion to the off time of switch S1 can be generated. The first voltage signal and the switching signal (e.g., $T_{S3\_ON/OFF}$) of switch S3 can be received, and a second chopped signal (e.g., $V_B$) that is in direct proportion to the off time of switch S3 can be generated. The first and second chopped signals can be received, and a filtered signal (e.g., $V_N$) can be generated therefrom. A comparison signal (e.g., output of CMP) can be generated by comparing the filtered signal against a first ramp signal (e.g., $V_P$), and a switch trigger signal (e.g., CLOCK) can be generated by processing the comparison signal via a single pulse generating circuit (e.g., "Oneshot").

For example, the first ramp signal can be generated by receiving a first current source and the switching signal of switch S1, and generating a first current signal (e.g., $I_{OSC}$) when switch S1 is turned off. The first current source and the switching signal of switch S3 can be received, and the first current signal can alternatively or additionally be generated when switch S3 is turned off. A first ramp signal can be generated by charging and discharging a first capacitor (e.g., $C_{OSC}$), where the first current signal is used to charge capacitor $C_{OSC}$.

When the switch trigger signal is activated, the PWM control circuit can control switches S1 and S3 to be turned off by applying a constant on time control scheme with a quasi-fixed frequency. This can include receiving a first voltage signal and the switching signal of switch S1, and generating a first chopped signal that is in direct proportion to the on time of switch S1. The first voltage signal and the switching signal of switch S3 can be received, and a second chopped signal can be generated that is in direct proportion to the on time of the first chopped signal. The first and chopped signals can be received, and a filtered signal can be generated therefrom. A comparison signal can be generated by comparing the filtered signal against a first ramp signal, and a switch trigger signal can be activated by processing the comparison signal via a single pulse generating circuit.

The first ramp signal may be generated by receiving the first current source and the switching signal of switch S1, and generating a first current signal when switch S1 is turned on. Also, the first current source and the switching signal of switch S3 can be received, and the first current signal can be generated when switch S3 is turned on. A first ramp signal can be generated by charging and discharging a first capacitor, where the first current signal is used to charge the first capacitor. In this way, a four-switch buck-boost converter may have a switching cycle that is fixed by controlling the turning on moment or turning off moment according to switches S1 and S3, so as to achieve fixed frequency control. As such, the system can remain in operation with a constant off time or constant on time, for improved stability compared to other approaches.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. An apparatus, comprising:
   a) a power stage circuit comprising a first switch, an inductor, and a fourth switch coupled in series between input and output terminals, a second switch having a first terminal coupled to a common node of said first switch and said inductor, and a second terminal coupled to ground, a third switch having a first terminal coupled to a common node of said fourth switch and said inductor, and a second terminal coupled to ground;
   b) a constant time control circuit configured to generate a switch trigger signal according to switching signals of said first and third switches;
   c) a pulse-width modulation (PWM) control circuit configured to receive an input voltage signal via said input terminal, an output voltage via said output terminal, and said switch trigger signal, and to generate switching signals to control said first, second, third, and fourth switches; and
   d) said PWM control circuit being configured to turn on or off said first and third switches in response to said switch trigger signal being activated.

2. The apparatus of claim 1, wherein said constant time control circuit comprises:
   a) a first chopping circuit configured to receive a first voltage signal and a switching signal of said first switch, and to generate a first chopped signal that is in direct proportion to an off time of said first switch;
   b) a second chopping circuit configured to receive said first voltage signal and a switching signal of said third switch, and to generate a second chopped signal that is in direct proportion to an off time of said third switch;
   c) a filter circuit configured to receive said first and second chopped signals, and to generate a filtered signal;
   d) a comparison circuit configured to receive said filtered signal and a first ramp signal, and to generate a comparison signal; and
   e) a single pulse generating circuit configured to generate said switch trigger signal in response to said comparison signal.

3. The apparatus of claim 2, wherein said first ramp signal is generated by a first ramp signal generator, comprising:
   a) a first controlled current source configured to receive a first current source and a switching signal of said first switch, and to generate a first current signal when said first switch is off;
   b) a second controlled current source configured to receive said first current source and a switching signal of said third switch, and to generate said first current signal when said third switch is off;
   c) a first capacitor having a first terminal coupled to output terminals of said first controlled and second controlled current sources, and a second terminal coupled to ground; and
   d) a fifth switch coupled in parallel to said first capacitor, and having a control terminal configured to receive said switch trigger signal.

4. The apparatus of claim 1, wherein said constant time control circuit comprises:
   a) a first chopping circuit configured to receive a first voltage signal and a switching signal of said first switch, and to generate a first chopped signal that is in direct proportion to an on time of said first switch;
   b) a second chopping circuit configured to receive said first voltage signal and a switching signal of said third switch, and to generate a second chopped signal that is in direct proportion to an on time of said third switch;
   c) a filter circuit configured to receive said first chopped signal and said second chopped signal, and to generate a filtered signal;
   d) a comparison circuit configured to receive said filtered signal and a first ramp signal, and to generate a comparison signal; and
   e) a single pulse generating circuit configured to generate said switch trigger signal in response to said comparison signal.

5. The switch control circuit of claim 4, wherein said first ramp signal is generated by a first ramp signal generator, comprising:
   a) a first controlled current source figured to receive a first current source and a switching signal of said first switch, and to generate a first current signal when said first switch is on;
   b) a second controlled current source configured to receive said first current source and a switching signal of said third switch, and to generate said first current signal when said third switch is on;
   c) a first capacitor having a first terminal coupled to output terminals of said first controlled and second controlled current sources, and a second terminal coupled to ground; and
   d) a fifth switch coupled in parallel to said first capacitor, and having a control terminal configured to receive said switch trigger signal.

6. A method, comprising:
   a) providing a power stage circuit comprising a first switch, an inductor, and a fourth switch coupled in series between input and output terminals, a second switch having a first terminal coupled to a common node of said first switch and said inductor, and a second terminal coupled to ground, a third switch having a first terminal coupled to a common node of said fourth switch and said inductor, and a second terminal coupled to ground;
   b) generating, by a constant time control circuit, a switch trigger signal according to switching signals of said first and third switches;
   c) generating switching signals to control said first, second, third, and fourth switches by a pulse-width modulation (PWM) control circuit, in response to an input voltage signal via said input terminal, an output voltage via said output terminal, and said switch trigger signal; and
   d) turning on or off said first and third switches by said PWM control circuit in response to said switch trigger signal being activated.

7. The method of claim 6, wherein said generating said switch trigger signal comprises:
   a) receiving, by a first chopping circuit, a first voltage signal and a switching signal of said first switch, and generating a first chopped signal that is in direct proportion to an off time of said first switch;
   b) receiving, by a second chopping circuit, said first voltage signal and a switching signal of said third switch, and generating a second chopped signal that is in direct proportion to an off time of said third switch;
   c) receiving, by a filter circuit, said first and second chopped signals, and generating a filtered signal;
   d) receiving, by a comparison circuit, said filtered signal and a first ramp signal, and generating a comparison signal; and
   e) generating, by a single pulse generating circuit, said switch trigger signal in response to said comparison signal.

8. The method of claim 7, further comprising:
a) receiving a first current source and a switching signal of said first switch, and generating a first current signal when said first switch is turned off;
b) receiving said first current source and said switching signal of said third switch, and generating said first current signal when said third switch is turned off; and
c) generating said first ramp signal by charging and discharging a first capacitor, wherein said first current signal is used to charge said first capacitor.

9. The method of claim 6, wherein said generating said switch trigger signal comprises:
a) receiving, by a first chopping circuit, a first voltage signal and a switching signal of said first switch, and generating a first chopped signal that is in direct proportion to an on time of said first switch;
b) receiving, by a second chopping circuit, said first voltage signal and a switching signal of said third switch, and generating a second chopped signal that is in direct proportion to an on time of said third switch;
c) receiving, by a filter circuit, said first chopped signal and said second chopped signal, and generating a filtered signal;
d) receiving, by a comparison circuit, said filtered signal and a first ramp signal, and generating a comparison signal; and
e) generating, by a single pulse generating circuit, said switch trigger signal in response to said comparison signal.

10. The method of claim 9, further comprising:
a) receiving a first current source and a switching signal of said first switch, and generating a first current signal when said first switch is turned on;
b) receiving said first current source and a switching signal of said third switch, and generating said first current signal when said third switch is turned on; and
c) generating a first ramp signal by charging and discharging a first capacitor, wherein said first current signal is used to charge said first capacitor.

* * * * *